United States Patent [19]

Gorgens et al.

[11] 4,109,537
[45] Aug. 29, 1978

[54] MOVEMENT CONSTRUCTION FOR A PRESSURE RESPONSIVE INSTRUMENT

[75] Inventors: Joseph E. Gorgens, Trumbull; Matthew Gerald Morris, Jr., Fairfield, both of Conn.

[73] Assignee: Dresser Industries, Inc., Dallas, Tex.

[21] Appl. No.: 775,007

[22] Filed: Mar. 7, 1977

[51] Int. Cl.² ............................................. G01L 7/04
[52] U.S. Cl. ....................................... 73/756; 73/741
[58] Field of Search .......................... 73/420, 411–418, 73/756, 732–743

[56] References Cited

U.S. PATENT DOCUMENTS

| 2,347,341 | 4/1944 | Rourke | 73/411 |
| 2,378,201 | 6/1945 | Dewan | 73/414 |
| 3,690,181 | 9/1972 | Kemmerer | 73/418 |

Primary Examiner—Donald O. Woodiel
Attorney, Agent, or Firm—Daniel Rubin

[57] ABSTRACT

An improved construction for securing the connecting link from the free end of a Bourdon tube to the segment gear in the geared movement of a pressure responsive instrument. An elongated flat spring clip, recessed in its center portion, has one open end from which it is longitudinally slotted inward. The opposite end is screw tapped for acting as a nut to receive a screw fastener. By a slip fit insertion of the spring clip over a controlled recess on the segment shaft, the clip is held in place in a controlled tensioned grip for captivating the nut at the fastener location of the segment gear. Should it be necessary to shift the fastener location for purposes of calibrating the instrument, the spring clip is finger slideable for relocation as required.

7 Claims, 8 Drawing Figures

MOVEMENT CONSTRUCTION FOR A PRESSURE RESPONSIVE INSTRUMENT

BACKGROUND OF THE INVENTION

1. The field of art to which the invention pertains comprises the art of measuring and testing of fluid pressures.

2. By and large the majority of better quality pressure sensitive instruments, such as the pressure gauge for measuring fluid pressure, employ a geared movement for translating Bourdon tube tip travel to an output utilization such as a readout pointer. These movements are well known and have been used commercially for many years. Typically, instruments of that type have a condition responsive element such as a Bourdon tube or the like providing arcuate deflection in response to condition changes to which the element is sensitive. In a common construction, as would be utilized in a pressure gauge, the geared movement is comprised of levers and gearing operably responsive to arcuate motion of the element for driving an output shaft supporting a rotatable pointer relative to a fixed dial plate. The dial graduation opposite the pointer position is indicative of the measured pressure value with which the instrument is being operated. Exemplifying such movements is the disclosure of U.S. Pat. No. 3,690,181 in which an elongated link connects the arcuate tail end of a pivotted segment gear with the free tip of the Bourdon tube. The segment gear in turn meshes with a pinion secured on the pointer shaft.

For connecting the link and segment gear it has been usual to employ screw and nut fasteners which have proven surprisingly difficult to handle because of the relatively close working conditions in which they must be installed. It is quite common for one or other of the screw or nut to be dropped more than once in the course of assembly. A captive nut for those purposes is disclosed in U.S. Pat. No. 3,690,181, supra. Further contributing toward the difficulty is that the point of connection between the link and segment gear frequently comprises the focal point for calibrating the instrument. This, therefore, may require disassembly and reassembly of the previous made connection for varying the distance between the point of connection and the pivot axis of the gear during a pressure test in order to ensure readout accuracy of the instrument. Similar complications can arise from replacement of a worn link or where necessary to replace one link with another of different length to obtain proper linearity in calibration. Such changes in calibration can involve nut displacements or adjustments on the order of 0.001 inches for gauges operative at one-half to one-quarter of one percent accuracy.

Whether for initial assembly purposes, calibration, link replacement or whatever, the difficulty and assembly time involved in joining the link to the segment gear have long been regarded as disproportionate to other aspects of the manufacturing operation. Despite recognition of the foregoing, a construction for greatly simplifying and reducing the previous expenditures of time and effort has not heretofore been readily known.

SUMMARY OF THE INVENTION

This invention relates to pressure instruments and more specifically to improvements in construction of the geared movement therefor. In accordance herewith, the link connecting the free tip travel of the Bourdon tube to the segment gear in such movements is secured by the combination of a screw and a spring clip defining a captive nut supported in a tensioned grip against the backside of the segment. The captive nut is formed of an elongated flat spring recessed in its central portion and raised at its ends. One end of the spring is longitudinally slotted or bifurcated in communication with a larger central opening in an elongated U-shape while the opposite end is screw tapped for acting as a nut to receive the fastener screw. When the spring clip is slipped in an embracing relation over a recess of controlled dimension formed in the segment shaft, it is held lightly tension gripped in place for captivating the nut at the connecting location. At the same time it continues to be freely slideable to vary the connecting location relative to the pivot axis for purposes of calibrating the instrument.

By the above construction, the nut once placed into position cannot rotate, cannot fall off and is preloaded against the segment to largely free the hands of the assembler while affording a more consistent "feel" necessary when adjusting the link position slightly for purposes of calibration. Consequently, by a relatively simple yet effective structure, it is readily possible to largely eliminate the manufacturing problems conconcerning such connections as have occurred in the prior art.

It is therefore an object of this invention to provide novel apparatus for improving the gear movement construction of a pressure sensitive instrument.

It is a further object of the invention to provide novel fastener structure for largely eliminating the difficulty and time factors associated in the prior art with joining the link from the free end of the Bourdon tube to the segment gear in the geared movement of a pressure instrument.

It is a further object of the invention to effect the foregoing objects with a construction incurring little, if any, additional material cost in offsetting the labor costs previously associated with similar purpose constructions of the prior art.

Figure 1:
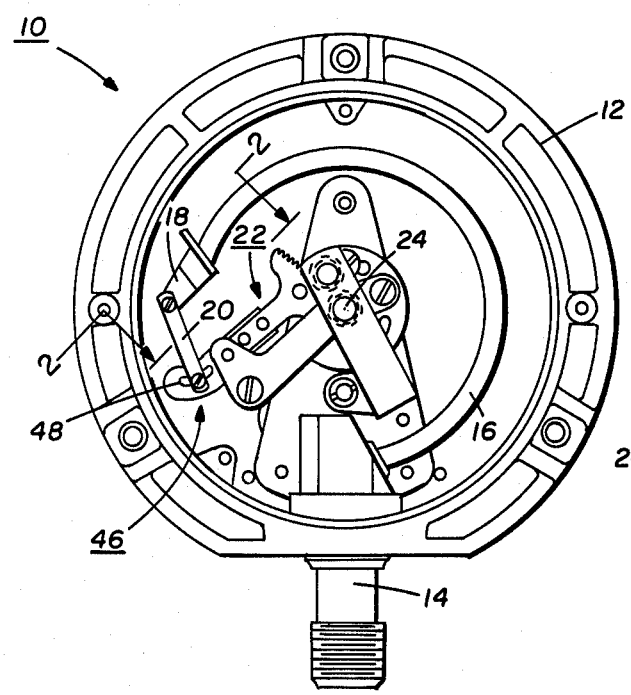
FIG. 1 is a rear elevation of a pressure gauge with the cover removed employing a gear movement incorporating the fastener improvements hereof.
Figure 2:
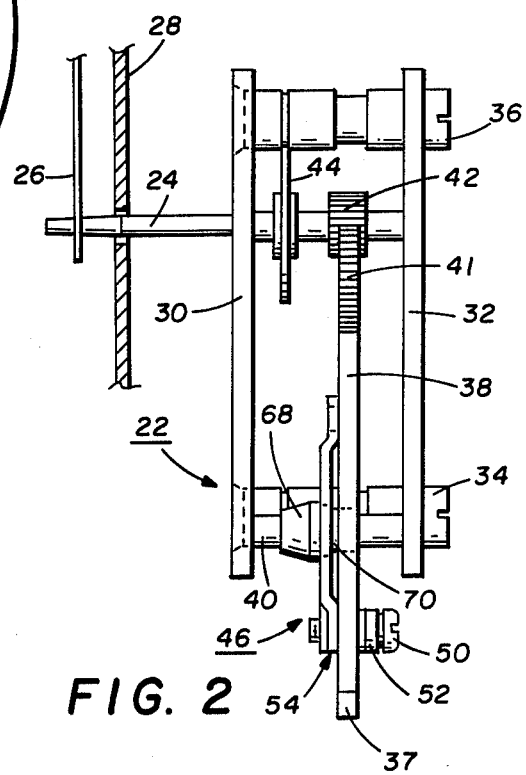
FIG. 2 is a fragmentary enlarged sectional elevation taken substantially along the lines 2—2 of FIG. 1.
Figure 3:
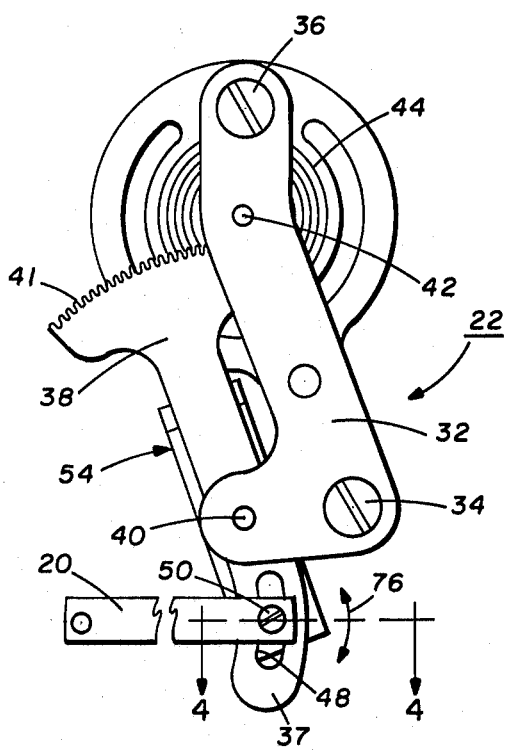
FIG. 3 is a further enlarged elevation of the gear movement of FIG. 1.

Referring initially to FIGS. 1-3 of the drawings, there is disclosed a pressure gauge designated 10 that includes a housing 12 for enclosing the operating components and through which a tubular stem 14 provides a pressure connection from a source to a Bourdon tube 16. The free end of the Bourdon tube 18 is subject to displacement in a well known manner in response to changes in measured pressure received through stem 14. Displacement of the Bourdon tube is transmitted via a link 20 to a geared movement 22 driving a rotatable pointer shaft 24. Supported on shaft 24 is a pointer 26 which is rotatably displaced relative to a dial face 28 containing graduations of pressure (not shown) over which the instrument is operative.

Comprising gear movement 22 are spaced apart parallel side plates 30 and 32 secured together via transverse screws 34 and 36 whereby to provide rotational support for pointer shaft 24 and the other operational components thereof. Receiving the input from link 20 is the tail end 37 of a segment gear 38 pivotally supported on a segment shaft 40 and meshing at its opposite toothed end 41 with a pinion 42 secured on pointer shaft 24. A tension wound hair spring 44 connected to shaft 24 serves to eliminate slack from the driving motion.

Figure 4:
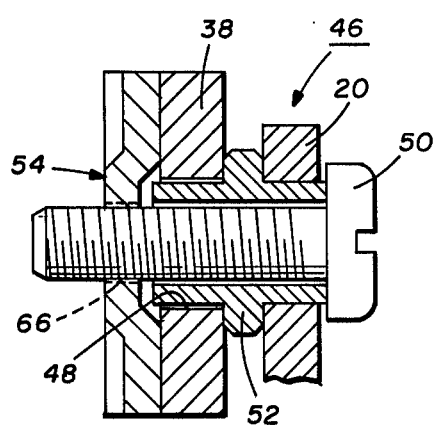
FIG. 4 is an enlarged sectional view seen substantially along the lines 4—4 of FIG. 3.

To secure or connect link 20 to tail end 37 of segment gear 38 there is provided a fastener connection 46 in accordance herewith as will be described with reference also to FIGS. 4–6. For the purpose of receiving the fastener elements as well as for calibration, tail end 37 of gear segment 38 includes an elongated arcuate slot 48 displaced inward from the distal end thereof. A fastener in the form of a cap screw 50 extending through a sleeve spacer 52 to a threaded connection with a captive nut spring clip 54 provides the means for securing the connection.

Figure 5:
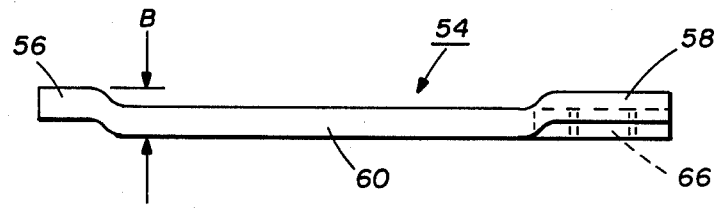
FIG. 5 is a side elevation of the captive nut fastener of the invention.
Figure 6:
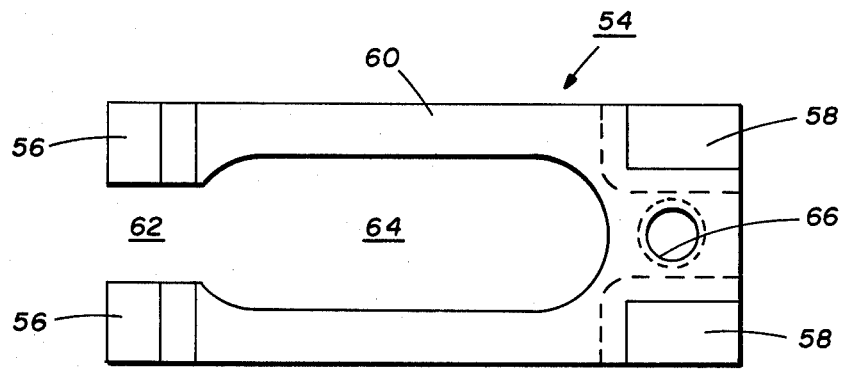
FIG. 6 is a top plan view of the nut fastener of FIG. 5.

Spring clip nut 54, which is best illustrated in FIGS. 5 and 6, is formed of an elongated spring-like metal having ends 56 and 58 extending in a plane displaced or raised from the plane of the central portion 60. Defined between ends 56 is a longitudinal cutout 62 which communicates inwardly with a transversely enlarged longitudinal cutout 64 in the central portion 60. Between ends 58 there is provided a central tapped aperture 66 to receive screw 50 for securing the connection as will be described.

Figure 7:
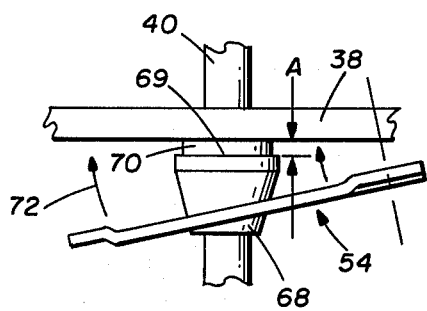
FIG. 7 illustrates an initial assembly step for the nut fastener of FIG. 5.
Figure 8:
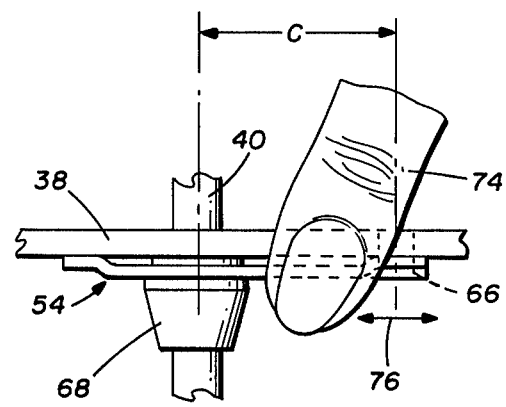
FIG. 8 illustrates a step in manipulating the nut fastener of FIG. 5 for the purpose of calibrating the instrument.

To receive and support spring clip 54 in place, segment shaft 40, as best seen in FIGS. 7 and 8, contains an integral tapered enlargement 68 having an inward shoulder 69 merging with a reduced diameter 70 contiguously supported against the side face of segment gear 38. For placing clip 54 on diameter 70, the clip is centrally positioned over shaft 40 and then forced upwardly over enlargement 68 in the direction of arrow 72. This spreads the clip sufficiently until snapping in place past shoulder 69 on diameter 70 against the side face of the segment gear. By controlling the axial dimension "A" of diameter 70 to a distance slightly less than recess dimension "B" of clip 54, snapping the clip in place in the foregoing manner imposes a tension grip thereat via ends 56 and 58 against the side face of gear 38. This dimensional difference is usually on the order of 0.003 inches but with tolerances can vary from between 0.001 inches and 0.009 inches.

The tension gripping force imposed between the components enables the relationship of FIG. 8 to be assumed in which the assembler's finger 74 is able to easily slide clip 54 in the directions of arrow 76. This is useful in achieving the slight variance of distance "C" between the axes of pivot 40 and aperture 66 for purposes of calibration. Whatever final fastener location is afforded by aperture 66, the spring clip is securely captured such that screw 50 can be conveniently assembled thereto in the manner of FIG. 4.

In use, assembly and/or adjustment of the joint, securing link 20 to segment gear 38 is accomplished by first placing spring clip 54 up over the tapered portion of enlargement 68 until positioned embracing diameter 70. When so placed clip 54 is held in a tension grip between the underside of segment gear 38 and shoulder 69. With a minimum of surface contact therebetween, the spring clip is free to be shifted longitudinally back and forth in the directions of arrow 76. As such, clip 54 is spring loaded with its aperture nut 66 captively held until such time as screw 50 with accompanying spacer 52 is inserted through segment slot 48 for a threading fastening therewith.

Should it be necessary to remove screw 50, as for example to replace link 20, nut 66 being spring loaded will not rotate, fall off or otherwise be subject to movement in the course of the link replacement. Similarly, when necessary for the purpose of calibrating the instrument, screw 50 can be removed or loosened whereby the nut 54 can be shifted in the directions of arrow 76 along the path of slot 48 as required for changing longitudinal distance "C" whereby calibrated accuracy of the instrument is obtained.

By the above description there has been disclosed novel apparatus for improving the gear movement construction in a pressure responsive instrument. By means of the captive nut construction hereof, it can be readily slid into position over the tapered enlargement 68 until snapped into the slot formed by diameter 70. In this manner, placement of the nut can be readily accomplished without the use of special tools while providing a consistent feel when necessary to shift the clip to its calibrated location. Placement into position is ensured as to significantly enhance both the calibration and assembly procedures as compared to previous similar purpose construction of the prior art. Whereas a pressure gauge has been described for purpose of disclosure, it should be apparent that other pressure sensitive instruments could gainfully employ the invention including those instruments in which pressure changes are induced by temperature sensitivity for which the instrument is principally employed.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a pressure operative instrument including a Bourdon tube, a gear movement for transmitting displacement of the Bourdon tube to an output drive and link means for connecting the free end of said Bourdon tube to the input of said movement, the improvement for connecting said link means to said movement input and comprising fastener means including a nut integrally formed near one end of an elongated spring clip, support means displaced from said movement input for supporting said spring clip near its other end in a grip engagement against said movement input with its nut in fastening relation at the connecting location thereof, and screw means to cooperate with said nut for connecting said link with said nut as said connecting location.

2. In a pressure operative instrument including a Bourdon tube, a gear movement comprising a segment gear for transmitting displacement of the Bourdon tube to an output drive and link means for connecting the free end of said Bourdon tube to the input of said movement, the improvement for connecting said link means to said movement input comprising fastener means including a nut integrally formed in an elongated spring clip, support means comprising a pivot support for said segment gear at an intermediate location between its input and output ends for also supporting said spring clip in a grip engagement against said movement input with its nut in fastening relation at the connecting location thereof, and screw means to cooperate with said nut for connecting said link with said nut at said connecting location.

3. In a pressure sensitive instrument according to claim 2 in which said segment gear is slotted at its input end for receiving said fastener means and said grip engagement of said spring clip is controlled to permit finger slideable positioning of said nut relative to the pivot axis of said support means for calibration of the instrument.

4. In a pressure sensitive instrument according to claim 2 in which said pivot support comprises the segment shaft and includes a shoulder formation spaced from an opposing face of said segment gear to define a controlled axial shaft spacing therebetween and said spring clip is supported on said segment shaft within said controlled spacing.

5. In a pressure sensitive instrument according to claim 4 in which said spring clip is shaped offset in its elongated direction such that a first portion engages the face of said shoulder without engaging the opposing face of said segment gear while a second portion engages the face of said segment gear without engaging the face of said shoulder.

6. In a pressure sensitive instrument according to claim 5 in which said shoulder formation comprises an integral enlargement on said segment shaft truncated outward toward said shoulder formation and said spring clip is bifurcated at one end for springed placement over said enlargement into said controlled spacing.

7. In a pressure sensitive instrument according to claim 6 in which the force of said grip engagement is of a controlled magnitude permitting finger displacement of the spring clip to relocate the nut thereof for changing the connecting location with said screw means.

* * * * *